(12) United States Patent
Bendig et al.

(10) Patent No.: US 7,134,683 B2
(45) Date of Patent: Nov. 14, 2006

(54) OCCUPANT PROTECTION DEVICE

(75) Inventors: Udo Bendig, Wettstetten (DE); Manuela Boin, Dornstadt (DE); Georg Rasch, Bibertal-Buhl (DE); Heinrich Einsiedel, Ulm (DE); Julius Schluppkotten, Munich (DE)

(73) Assignees: Takata-Petri AG, Berlin (DE); BMW AG, Munich (DE)

( * ) Notice: Subject to any disclaimer, the term of this patent is extended or adjusted under 35 U.S.C. 154(b) by 253 days.

(21) Appl. No.: 10/673,547

(22) Filed: Sep. 30, 2003

(65) Prior Publication Data

US 2004/0232665 A1 Nov. 25, 2004

(30) Foreign Application Priority Data

Sep. 30, 2002 (DE) ................. 102 46 545

(51) Int. Cl.
*B60R 21/213* (2006.01)
*B60R 21/231* (2006.01)

(52) U.S. Cl. ................. 280/730.1; 280/730.2; 280/749

(58) Field of Classification Search ............. 280/728.1, 280/729, 730.1, 730.2, 749, 755, 756
See application file for complete search history.

(56) References Cited

U.S. PATENT DOCUMENTS

| 2,834,606 | A | | 5/1958 | Berrand |
| 5,470,103 | A | | 11/1995 | Vaillancourt et al. |
| 5,988,735 | A | | 11/1999 | Müller |
| 6,007,089 | A | * | 12/1999 | Gotz et al. ............... 280/728.3 |
| 6,113,132 | A | * | 9/2000 | Saslecov .................. 280/730.1 |
| 6,135,491 | A | | 10/2000 | Olson et al. |
| 6,168,190 | B1 | | 1/2001 | Bowers et al. |
| 6,378,895 | B1 | * | 4/2002 | Brucker et al. .......... 280/730.2 |
| 6,688,641 | B1 | * | 2/2004 | Dominissini ............. 280/730.2 |
| 6,783,152 | B1 | * | 8/2004 | Tanase et al. ............ 280/730.1 |
| 2001/0052693 | A1 | | 12/2001 | Mueller |
| 2002/0024203 | A1 | | 2/2002 | Takahashi |
| 2004/0239083 | A1 | * | 12/2004 | Mori et al. ............... 280/730.1 |

FOREIGN PATENT DOCUMENTS

| DE | 92 02 725.3 U1 | | 9/1992 |
| DE | 4426733 A1 | * | 2/1995 |
| DE | 196 32 222 A1 | | 2/1998 |
| DE | 297 16 574 U1 | | 3/1998 |
| DE | 199 37 678 A1 | | 3/2000 |
| DE | 10039810 A1 | * | 2/2002 |
| DE | 100 56 298 A1 | | 5/2002 |
| JP | 2003-182503 A | | 7/2003 |

\* cited by examiner

*Primary Examiner*—David R. Dunn
*Assistant Examiner*—Laura B Rosenberg
(74) *Attorney, Agent, or Firm*—Foley & Lardner LLP

(57) ABSTRACT

An occupant protection device having an inflatable airbag for protecting a vehicle occupant in the rear compartment of a vehicle. The airbag being designed is fastened in the roof region of the vehicle so that, when inflated, the airbag at least partially covers both the side wall and/or the side window of the vehicle and also the rear window and/or the rear wall of the vehicle.

12 Claims, 1 Drawing Sheet

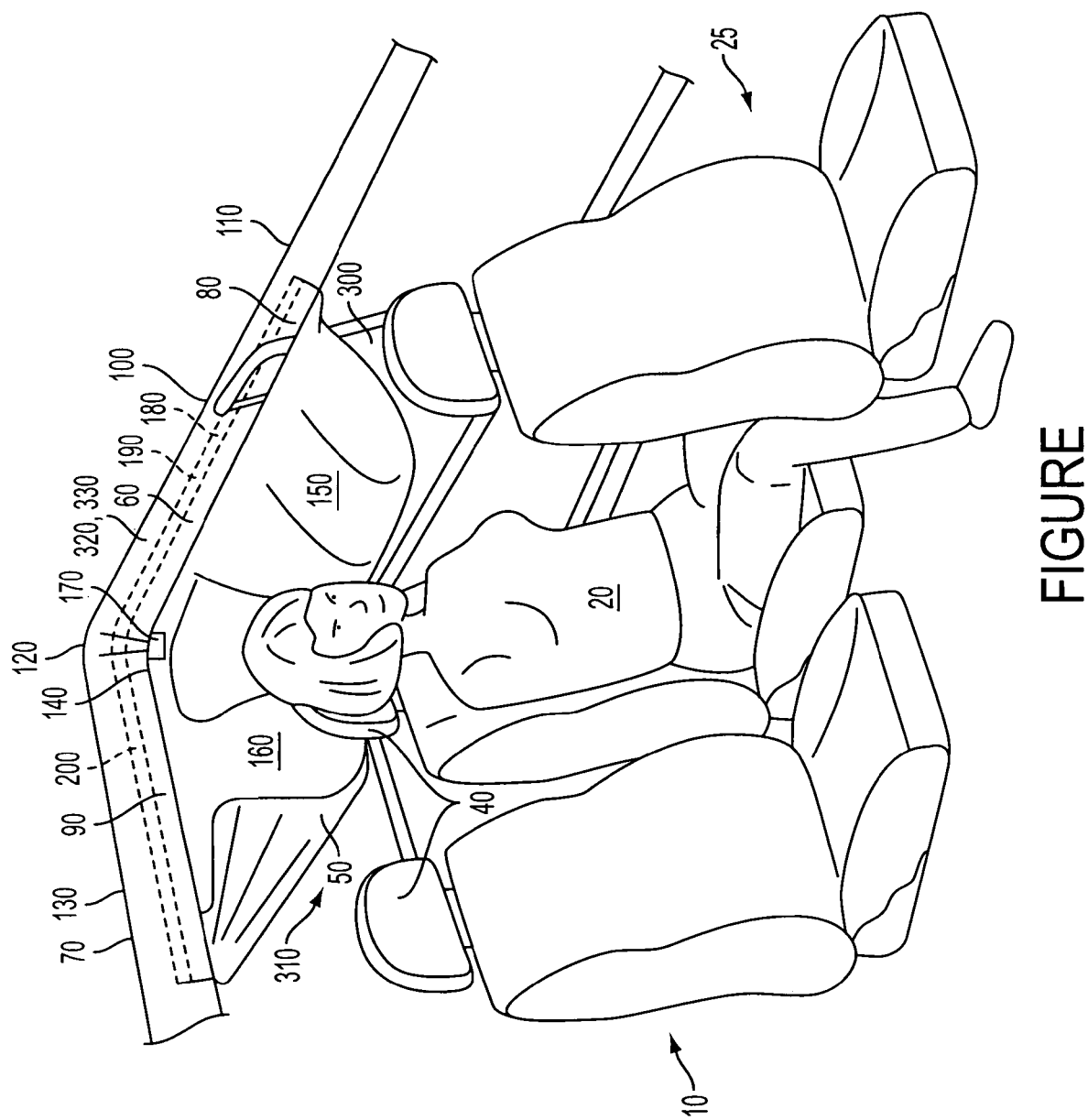
FIGURE

OCCUPANT PROTECTION DEVICE

BACKGROUND OF THE INVENTION

The present invention relates to an occupant protection device having an inflatable airbag for protecting a vehicle occupant in the rear compartment of a vehicle.

An exemplary occupant protection device is described in German utility model G 92 02 725.3 (incorporated by reference herein). In the disclosed occupant protection device, an airbag is integrated in a backrest or in a head restraint of a vehicle seat. In the event of an accident, the airbag is inflated and unfolds. The airbag has three airbag sections: as it inflates, a first airbag section pushes between the head of the vehicle occupant and the side door of the vehicle; this first airbag section is referred to in the utility model as an "outer side cushion". Approximately at right angles to this outer side cushion, a "skull cushion" is provided as a second airbag section and is positioned above the vehicle occupant's head. A wedge-shaped extension is integrally formed on the skull cushion as a third airbag section and, as the airbag swells, pushes behind the driver's neck. In summary, the previously known occupant protection device therefore has an airbag which is integrated in the seat or in the head restraint of the seat and, after inflation, is intended to provide "all-round" protection.

Another exemplary occupant protection device is described in German utility model 297 16 574 U1 (incorporated by reference herein). The disclosed occupant protection device has side airbags which are integrated in the rooflining covering. The side airbags are connected to a gas generator which is accommodated in the rear region of the vehicle.

German Offenlegungsschrift 199 37 678 (incorporated by reference herein) describes an occupant restraint device in a lorry. In this device, a holding container for an airbag is situated between the driver's seat and the rear wall or the backlight of the lorry. In the event of an accident, the airbag unfolds between the driver's seat and the rear wall, as a result of which the vehicle occupant's head is prevented from striking against the rear wall or against the backlight of the lorry.

Rear region airbags which unfold between the rear window of the vehicle and the vehicle occupant's head are also described in U.S. patent specification 2,834,606 (incorporated by reference herein).

SUMMARY OF THE INVENTION

The present invention is related to an occupant protection device which provides protection to a vehicle occupant in the rear compartment of a vehicle in the event of an accident.

According to an embodiment of the present invention, provision is made for the airbag to be designed in such a manner and fastened in the roof region of the vehicle in such a manner that, when inflated, it at least partially covers both the side wall and/or the side window of the vehicle and also the rear window and/or the rear wall of the vehicle. As a result, the vehicle occupant is very universally protected; this means that the occupant protection device affords him protection in a multiplicity of possible accident scenarios. Owing to the covering of side and rear window or wall, the vehicle occupant is therefore very well protected in the event of a side impact, in the event of the vehicle rolling over, in the event of a rear impact and even in the event of an oblique impact.

According to an embodiment of the occupant protection device according to the invention, the airbag is fixed in the roof region. The airbag can firstly be very easily "concealed" in the roof region by means of a suitable covering, as a result of which a visual influence on the interior is largely avoided. The complete occupant protection device can already be fitted to the "body shell" of the vehicle.

Within the context of an advantageous development of the occupant protection device according to another embodiment of the invention, provision is made for the airbag to be integrated in the roof in such a manner that it is concealed by a rooflining and/or by the roof covering. This measure enables the presence of the occupant protection device in the vehicle to be virtually completely hidden.

In order to cover the side wall/side window—in the following text, for the sake of simplicity, the term "side window" is used to represent the side wall and/or side window and the term "rear window" is used to represent the rear window and/or rear wall—and rear window, it is regarded as being advantageous if the airbag, when inflated, has two airbag regions which are arranged at a right angle to each other and of which a first region in each case at least partially covers the side window of the vehicle and a second region in each case at least partially covers the rear window of the vehicle. One advantage of this refinement is to be seen in the fact that the design of the airbag means that it can "nestle" very snugly against the side window and the rear window, so that specific positioning of the airbag in front of the side window and rear window is possible.

In order to ensure the positioning of the airbag in front of the rear window and side window, an embodiment of the invention provides for the first airbag region to be integrated in a first roof section of the vehicle roof and the second airbag region is integrated in a second roof section of the vehicle roof, the first roof section running along the lateral roof frame as far as the rear pillar of the vehicle and the second roof section extending from the rear pillar along a rear cross member. Owing to the arrangement of the first airbag region, which is provided for the side window, "above" the side window and the arrangement of the second airbag region, which is provided for the rear window, "above" the rear window, very precise positioning of the unfolding airbag in front of the rear window and side window is achieved.

In order to protect the airbag of the occupant protection device, another embodiment of the invention provides the airbag to be stored in a holding container.

For simple installation of the holding container in the roof, the holding container may have a first sub-container which is situated in the first roof section, and the holding container has a second sub-container which is connected to the first sub-container in the region of the rear pillar and is situated in the second roof section. The first airbag region is then stored in the first sub-container of the holding container and the second airbag region is stored in the second sub-container of the holding container.

For uniform and rapid filling of the airbag, the airbag may be connected to a filling tube for inflating the airbag. With regard to the installation of the filling tube, the filling tube may have a first and a second filling tube section, the first filling tube section being situated in the first roof section and the second filling tube section being situated in the second roof section.

There is sufficient space for a gas generator for inflating the airbag particularly in the region of the rear pillar of the vehicle. It is therefore included in the scope of the present invention to provide a gas generator which is fixed in the region of the rear pillar of the vehicle and is connected to the filling tube. The gas generator may, of course, also be fixed in the first or second roof section; a covering or the like (for example, also a rooflining) may be provided for covering purposes merely with regard to visual considerations.

In order to ensure that the airbag unfolds as tightly as possible against the rear window and side window, it is regarded as being advantageous if the airbag is shaped in such a manner that its second airbag region unfolds as it inflates between a head restraint of the occupant's seat and the rear window or rear wall.

Cold gas or hybrid gas generators are particularly recommended for filling the airbag with gas.

is to be understood that both the foregoing general description and the following detailed description are exemplary and exemplary only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

The FIGURE shows an exemplary embodiment for an occupant protection device according to the invention.

DETAILED DESCRIPTION OF THE PREFERRED EMBODIMENTS

In the FIGURE, an occupant protection device 10 for protecting a vehicle occupant 20 in the event of an accident can be seen. In the FIGURE, the vehicle occupant 20 is on an occupant's seat 30 in the rear compartment of the vehicle 25. The occupant seat 30 is equipped with a head restraint 40.

In the event of a vehicle accident, an airbag 50 of the occupant protection device 10 is—as illustrated in the FIGURE—inflated. The airbag 50 is—when not inflated—accommodated in a holding container 60 which is fastened in the roof region 70 of the vehicle 25. The holding container 60 comprises two sub-containers 80, 90 which are at right angles to each other.

In the exemplary embodiment shown in the FIGURE, the first sub-container 80 is situated in a first roof section 100 of the roof region 70; this first roof section 100 runs along the lateral roof frame 110 as far as the rear pillar 120 of the vehicle 25. The first roof section 100 is adjoined by a second roof section 130 which extends from the rear pillar 120 along a rear cross member 140. The second sub-container 90 is arranged in this second roof section 130.

When inflated, the airbag 100 has two airbag regions (cushion regions) 150 and 160. The two airbag regions 150 and 160 are at angle to each other of approximately 90°. In this case, the first airbag region 150 is arranged in the first roof section 100 and—when not inflated—is situated in the first sub-container 80 of the holding container 60. The second airbag region 160 is arranged in the second roof section 130 and is situated—uninflated—in the second sub-container 90 of the holding container 70.

A gas generator 170 to which a filling tube 180 is connected is accommodated in the rear pillar 120. The filling tube 180 is connected to the airbag 50 and inflates the airbag when the gas generator 170 is activated. The filling tube 180 is—in the same manner as the holding container 60 and the airbag 50—divided into two subsections: a first filling tube section 190 is situated in the first roof section—for example, in or on the first sub-container 80—and the second filling tube section 200 is situated in the second roof section 130—for example, in or on the second sub-container 90. The two filling tube sections 190 and 200 are therefore likewise at right angles to each other.

The occupant protection device 10 is operated as follows: if a vehicle accident occurs, the gas generator 170 is activated in a known manner. The gas generator 170 then blows gas into the filling tube 180 and therefore into the airbag 50. The airbag 50 inflates and then, with its first airbag region 150, covers the side window 300 or the side wall of the vehicle 25.

With its second airbag region 160, the inflated airbag 50 covers the rear window 310 or the rear wall of the vehicle 25.

In order to avoid the airbag 50 and the holding container 60 being visible in the original state-i.e. before an accident, the holding container 60 may be covered by a roof covering 320, in particular also by a roof-lining 330.

The priority application, German Application No. 102 46 545.2 filed on Sep. 30, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device for protecting a vehicle occupant in a rear compartment of a vehicle comprising:
    an airbag fastened in a roof region of the vehicle so that, when inflated, the airbag at least partially covers one of a side wall, a side window, or a combination thereof of the vehicle and also covers one of a rear window, a rear wall, or a combination thereof of the vehicle;
    wherein the airbag is connected to a filling tube for inflating the airbag; and
    wherein the filling tube has a first filling tube section and a second filling tube section, the first filling tube section being situated in a first roof section and the second filling tube section being situated in a second roof section.

2. Occupant protection device according to claim 1, wherein the airbag is integrated in the roof region so that the airbag is concealed by one of a rooflining, a roof covering, or a combination thereof.

3. Occupant protection device according to claim 1, wherein the airbag, when inflated, has two airbag regions which are arranged at a right angle to each other and of which a first region at least partially covers one of the side wall, the side window, or a combination thereof of the vehicle and a second region at least partially covers one of the rear window, the rear wall, or a combination thereof of the vehicle.

4. Occupant protection device according to claim 3, wherein the first airbag region is integrated in the first roof section of the vehicle roof and the second airbag region is integrated in the second roof section of the vehicle roof, the first roof section running along a lateral roof frame as far as a rear pillar of the vehicle and the second roof section extending along a rear cross member.

5. Occupant protection device according to claim 3, wherein the airbag is shaped so that the second airbag region unfolds as it inflates between a head restraint of the occupant's seat and the rear window or rear wall.

6. Occupant protection device according to claim 1, wherein the airbag is stored in a holding container which is fastened in the roof region of the vehicle.

7. Occupant protection device according to claim 1, wherein a cold gas generator or a hybrid gas generator is connected to the airbag.

8. An occupant protection device for protecting a vehicle occupant in a rear compartment of a vehicle comprising:
   an airbag fastened in a roof region of the vehicle so that, when inflated, the airbag at least partially covers one of a side wall, a side window, or a combination thereof of the vehicle and also covers one of a rear window, a rear wall, or a combination thereof of the vehicle,
   wherein the airbag is stored in a holding container which is fastened in the roof region of the vehicle, and
   wherein the holding container has a first sub-container which is situated in a first roof section, and the holding container has a second sub-container which is connected to the first sub-container in the region of a rear pillar and is situated in a second roof section.

9. Occupant protection device according to claim 8, wherein a first airbag region is stored in the first sub-container of the holding container and a second airbag region is stored in the second sub-container of the holding container.

10. Occupant protection device according to claim 9, wherein the airbag is connected to a filling tube for inflating the airbag.

11. Occupant protection device according to claim 10, wherein the filling tube has a first filling tube section and a second filling tube section, the first filling tube section being situated in the first roof section and the second filling tube section being situated in the second roof section.

12. Occupant protection device according to claim 10; wherein a gas generator which is fixed in the region of the rear pillar of the vehicle is connected to the filling tube.

* * * * *